United States Patent
De Rees et al.

[15] 3,703,053
[45] Nov. 21, 1972

[54] VEHICLE WINDOW INSTALLATION

[72] Inventors: Delbert D. De Rees, Utica; Gerald R. Walker, Warren, both of Mich.

[73] Assignee: General Motors Corporation, Detroit, Mich.

[22] Filed: Sept. 17, 1971

[21] Appl. No.: 181,350

[52] U.S. Cl. .....................49/428, 49/375, 49/440
[51] Int. Cl. .....................E05d 15/16, E05d 13/02
[58] Field of Search.................49/40, 227, 348–351, 49/372, 374, 375, 414–420, 425, 428, 436–441

[56] References Cited

UNITED STATES PATENTS

| | | | |
|---|---|---|---|
| 3,383,800 | 5/1968 | Sturtevant | 49/428 |
| 3,385,000 | 5/1968 | Sturtevant et al. | 49/428 X |

*Primary Examiner*—J. Karl Bell
*Attorney*—W. E. Finken et al.

[57] ABSTRACT

A door mounted vehicle window installation particularly adapted for easy positional adjustment of the window, the installation including a guide member projecting above the upper margin of the door and carrying a pair of follower units each having a pivot shaft projecting perpendicularly to the path of motion defined by the guide member, a pair of circular eccentric bushings each rotatably supported on a respective one of the pivot shafts, and a window having a pair of circular apertures therein adapted to rotatably receive a corresponding one of the bushings. When the window is in a closed or raised position, each bushing is situated above the upper margin of the door for easy accessibility and each functions upon rotation about the corresponding pivot shaft to shift the position of the window relative to the door.

3 Claims, 5 Drawing Figures

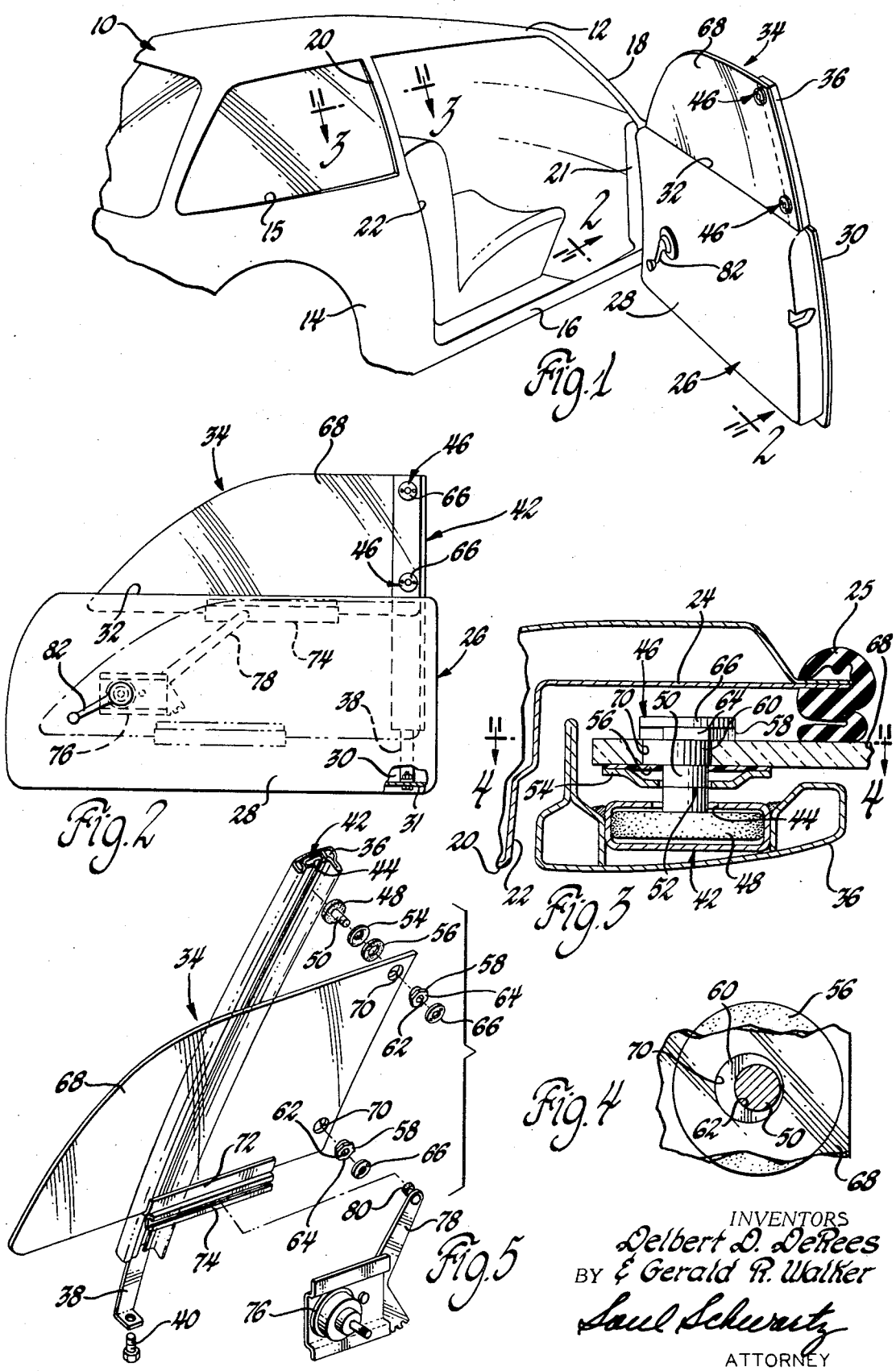

VEHICLE WINDOW INSTALLATION

This invention relates generally to vehicle window installations and more particularly to a window installation wherein positional adjustment of the window relative to its opening can be effected without prior removal of any trim panels or the like.

Automotive engineers constantly strive to simplify the various systems of the vehicle. In the area of vehicle window installations, for example, it has long been the practice to support a window on the body for generally vertical movement between a closed or raised position and an open or lowered position wherein the window is stowed below the window opening in a well defined by the body sheet metal. It has also been traditional to provide means for adjusting the position of the window relative to the opening, the adjusting means normally being located below the window opening and requiring removal of a number of pieces of trim or the like before adjustment can be effected. A window installation according to this invention represents an improvement over these traditional arrangements in that the adjusting means are directly accessible when the window is in the closed position so that adjustment can be easily effected without removal of cover or trim panels.

The primary feature, then, of this invention is that it provides a new and improved window installation for a vehicle body. Another feature of this invention is that it provides a new and improved vehicle window installation wherein a window, movable between open and closed positions relative to an opening in the vehicle body, is guided by a guide and follower arrangement incorporating positional adjustment means which are directly accessible whenever the window is in the closed position. Yet another feature of this invention resides in the provision of a guide and follower arrangement including a guide member mounted on the body, a follower member bodily movable in a path defined by the guide member, and a bushing eccentrically rotatable on a rigid projection extending from the follower member, the bushing being rotatably journaled on the window so that eccentric rotation of the bushing on the projection effects bodily movement of the window. Still further features of this invention reside in the provision of a guide member disposed on the exterior side of the window opening and in the provision of a projection of the follower member extending toward the interior of the vehicle body, the projection and the eccentric bushing thereon thus being directly accessible whenever the window is in the raised or closed position.

These and other features of this invention will be readily apparent from the following specification and from the drawings wherein:

FIG. 1 is a fragmentary perspective view of a vehicle body incorporating a window installation according to this invention;

FIG. 2 is a view taken generally along the plane indicated by lines 2—2 in FIG. 1 and showing the window in the raised and lowered positions respectively in solid and broken lines;

FIG. 3 is an enlarged sectional view taken generally along the plane indicated by lines 3—3 in FIG. 1 but with the door in a closed position;

FIG. 4 is a sectional view taken generally along the plane indicated by lines 4—4 in FIG. 3; and FIG. 5 is an exploded perspective view of the window installation according to this invention.

Referring now to FIG. 1 of the drawings, there shown is a vehicle body designated generally 10 having a roof structure 12, a right quarter panel structure 14 the upper margin 15 of which defines the vehicle belt line, a right rocker panel structure 16, a forward body pillar 18 and a center body pillar 20. The roof, quarter panel and rocker panel structures cooperate with the body pillars and the front door jamb 21 in defining a door opening 22 through which access may be had to the interior of the vehicle body. As seen best in FIG. 3, the center body pillar 20 is generally L-shaped in cross section and includes a generally vertical panel structure 24 projecting slightly into the door opening 22 and carrying at its innermost end a seal member 25.

A door 26 is vertically hinged to the vehicle body at the forward edge of the door opening by conventional means for swinging movement between an open position, FIG. 1, and a closed position, not shown, closing the lower portion of the door opening. The door includes an inner panel 28 and an outer panel 30 hem flanged together to form a window well therebetween bounded at the bottom by a side 31 and at the top by an edge having a longitudinal slot 32 therein, the height of the door being such that in the closed position of the latter the top edge thereof lies generally at the vehicle belt line. The door 26 has supported thereon a window installation according to this invention and designated generally 34 selectively operable to close the upper portion of the door opening above the belt line in the closed position of the door.

As seen best in FIGS. 1, 2, 3 and 5, the window installation 34 includes an elongated stub frame 36 having a bracket 38 projecting from the lower end thereof. The stub frame is adapted to be rigidly supported on the door in a generally vertical orientation adjacent the rear vertical edge of the latter, FIG. 1. The lower end of the stub frame is fastened to the door by means of a threaded fastener 40 which projects through an appropriate aperture in the side 31 and a corresponding aperture in the bracket 38. Adjacent the upper edge of the door the stub frame is attached thereto by conventional means, not shown, which prevent shifting of the stub frame longitudinally of the door but which permit limited lateral tilting thereof about a longitudinal axis adjacent the belt line, such lateral tilting being accompanied by lateral movement of the bracket 38 between the inner and outer panels of the door. An elongated channel-shaped guide member 42 having a mouth portion 44 coextensive therewith is rigidly attached to the stub frame 36, as by welding, within an appropriate recess in the latter, the mouth portion 44 opening toward the interior of the vehicle body in the closed position of the door.

As seen best in FIGS. 3, 4 and 5, the window installation 34 further includes a pair of identical follower units 46 adapted for reception in and bodily movable relative to the guide member 42. Describing only one of the follower units, the latter includes a roller 48 adapted for rolling movement within the guide member 42. A pivot shaft 50 having a shoulder 52 thereon is rotatably carried by the roller 48 and projects rigidly and generally perpendicularly therefrom through the mouth portion 44 of the guide member 42. A generally cup-shaped spring clip 54 and a circular resilient pad 56 are freely received on the pivot shaft 50 and an eccentric bushing 58 is rotatably supported on the pivot shaft outboard of the resilient pad 56. The bushing 58 has a circular lobe portion 60 with a bore 62, FIG. 5, extending therethrough, the bore being located eccentrically with respect to the center of the circular lobe portion, and further includes an integral hexagonal flange 64 the edges of which are disposed symmetrically about the bore 62. The clip, the resilient pad, and the eccentric bushing are retained on the pivot shaft 50 by a spanner nut 66 threadedly received on the pivot shaft.

The follower units 46 are longitudinally bodily movable relative to the guide member 42 in a path of motion defined thereby and function to retain a window 68 on the door and to guide the former in a generally vertical path of motion through the slot 32 between a raised or closed position, shown in FIG. 1 and in solid lines in FIG. 2, and an open or lowered position, shown in broken lines in FIG. 2, stowed within the door between the inner and outer panels. As seen best in FIGS. 4 and 5, the window 68 has formed therein a pair of circular apertures 70 of diameter generally equal to the diameter of circular lobe portion 60 on eccentric bushing 58. With the eccentric bushing 58 and spanner nut 66 removed from each of the follower units, the circular apertures 70 in the window are received about respective ones of the pivot shafts 50 of the follower units. When the eccentric bushings are refitted on the pivot shafts, the circular lobe portions thereof are closely and rotatably received within the circular apertures 70 in the window. The spanner nuts 66, rethreaded on the pivot shafts, are tightened until the window is tightly clamped between the resilient pad 56 which is backed by spring clip 54 which abuts shoulder 52 on the pivot shaft and the flange 64 which is backed by the spanner nut. The follower units thus simultaneously prevent separation of the window from the guide member and the door while constraining the window to move in a predetermined path of motion between the raised and lowered positions thereof.

A sash plate 72 having a cam channel segment 74 attached thereto is rigidly affixed to the window 68 at the lower margin thereof. A window regulator 76 is rigidly attached to the inner panel 28 of the door and includes a lift arm 78 carrying a roller follower assembly 80 adapted to be received in the cam channel segment 74 in a conventional manner. The window regulator is manually driven by a handle 82, FIG. 1, and functions to bodily move the window between the raised and lowered positions thereof.

Typically, when the window 68 is installed on the door the lateral or tilt adjustment made to bring the window into proper relation to the seals around the door opening is seldom altered thereafter. This adjustment is effected by shifting the bracket 38 inboard or outboard of the door and then clamping the bracket to the side 31 by means of fastener 40. The longitudinal adjustment and the rotational adjustment of the window effected at installation may, however, require subsequent alteration and the window installation 34 is designed to facilitate such adjustments both during initial assembly and in the field.

Referring to FIGS. 1, 2 and 3, with the window retained on the guide member by the follower units 46 and in the raised position, both follower units are situated above the belt line and directly accessible. To adjust the window longitudinally of the door both spanner nuts 66 are loosened and the hexagonal flanges grasped to rotate the eccentric bushings. As the latter rotate eccentrically about their respective pivot shafts, the window is shifted fore or aft. To effect rotational adjustment of the window only one of the spanner nuts is loosened and the corresponding eccentric bushing rotated by means of the hexagonal flange.

It will, of course, be apparent that the fore and aft and rotary adjustments described require virtually no preparation and can be easily effected whenever the need becomes apparent. Further, if removal of the window subsequent to installation is required, it is easily accomplished merely by removing the spanner nuts and the eccentric bushings to permit withdrawal of the window from the pivot shafts and manipulation of the roller follower 80 out of the cam channel segment 74.

When the door is swung from the open to the closed position, the window 68 seats against the seal member 25, FIG. 3, which functions to provide a weather tight seal between the interior and exterior of the vehicle body and to dampen vibrations of the window. The stub frame 36, in the closed position of the door, extends to the top of the door opening and lies generally within the confines of body pillar 20 so that continuity of exterior appearance is maintained.

Having thus described the invention, what is claimed is:

1. In a vehicle body having an opening therein, the combination comprising, a guide member secured to said vehicle body in fixed relation to said opening, a closure member, a follower member having a support projection thereon, means mounting said follower member on said guide member for bodily movement longitudinally of said guide member in a path of motion defined by the latter with a portion of said support projection extending generally perpendicularly to said opening, a circular bushing having an aperture therein situated eccentrically with respect to the center of said bushing and adapted to be closely and rotatably received on said support projection so that said bushing is eccentrically rotatable about said support projection, means on said closure member adapted to closely and rotatably receive said bushing so that said closure member is constrained by said follower member to move in a path of motion defined by said guide member between an open position and a closed position closing said opening, said bushing upon eccentric rotation relative to said support projection shifting said closure member relative to said opening for effecting positional adjustment of said closure member, and means adapted to secure said bushing in any angular position thereof relative to said support projection for maintaining the adjustment of said closure member.

2. In a vehicle body having an opening therein, the combination comprising, an elongated guide member having a mouth portion extending the length of said guide member, means supporting the guide member on the vehicle body on the exterior side of said opening in fixed relation to the latter and generally adjacent one edge thereof with said mouth portion opening toward the interior of said vehicle body, a closure member adapted to close said opening, a follower member having a support projection thereon, means mounting said follower member on said guide member for bodily movement relative thereto in a path of motion defined thereby and with said support projection extending through said mouth portion and into said opening in a direction generally perpendicular to the latter, a circular bushing having an aperture therein situated eccentrically with respect to the center of said bushing and adapted to be closely and rotatably received on said support projection so that said bushing is eccentrically rotatable about said support projection, means defining a circular aperture in said closure member adapted to closely and rotatably receive said bushing so that said closure member is constrained by said follower member to move in a path of motion defined by said guide member between a closed position in said opening and an open position remote therefrom, said bushing in the closed position of said closure member being situated in said opening for easy accessibility and being operative upon eccentric rotation thereof relative to said support projection to shift said closure member relative to said opening for effecting positional adjustment of said closure member, and means adapted to secure said bushing in any angular position thereof relative to said support projection for maintaining the adjustment of said closure member.

3. In a vehicle body having an opening therein and a door supported thereon for swinging movement about a generally vertical axis situated adjacent the forward vertical edge of said opening between an open position and a closed position closing the lower portion of said opening, the combination comprising, a stub frame rigidly supported on said door adjacent the rear vertical edge thereof and projecting upwardly therefrom generally to the upper margin of said opening, an elongated guide member having a mouth portion extending the length thereof, means supporting said guide member on said stub frame with said mouth portion opening toward the interior of said vehicle body in the closed position of said door, a window, a pair of follower units each including a follower element and a pivot shaft projecting rigidly from said follower element, each of said follower elements being received in said guide member for bodily movement relative thereto in a path defined by said guide member and with each of said pivot shafts extending through said mouth portion in generally perpendicular relation to said vehicle body opening in the closed position of said door, a pair of circular bushings each having an aperture therein situated eccentrically with respect to the center of the corresponding one of said bushings and adapted to be closely and rotatably received on respective ones of said pivot shafts so that each of said bushings is eccentrically rotatable about a corresponding one of said pivot shafts, means defining a pair of vertically spaced circular apertures in said window adjacent the rearward vertical edge thereof, each of said apertures being adapted to closely and rotatably receive a respective one of said bushings so that said window is constrained by said follower units to move in a path of motion defined by said guide member between a raised position closing the upper portion of said vehicle body opening in the closed position of said door and a lowered position stowed within said door, each of said bushings in the raised position of the window being situated above the upper margin of said door for easy accessibility and operative upon eccentric rotation about the corresponding one of said pivot shafts to shift said window relative to the door for effecting positional adjustment of the former relative to said vehicle body opening, means on each of said pivot shafts adapted to secure the corresponding one of said bushings in any angular position relative to said pivot shafts for maintaining the adjustment of said window, and window regulator means on said door selectively operable to bodily move said window between the raised and the lowered positions thereof.

* * * * *